Patented Apr. 2, 1946

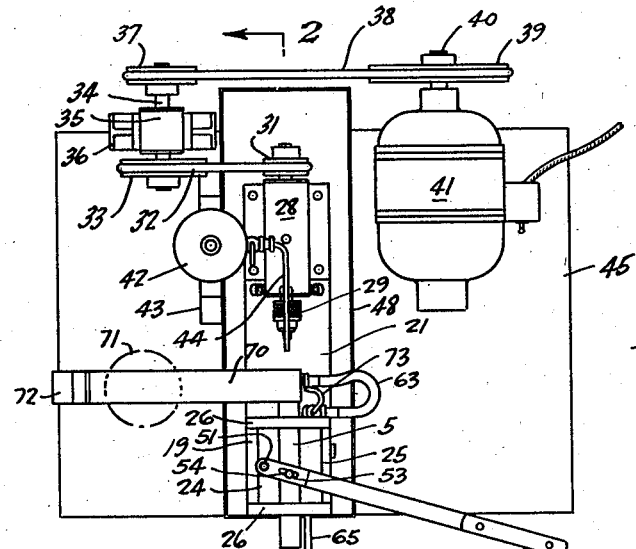

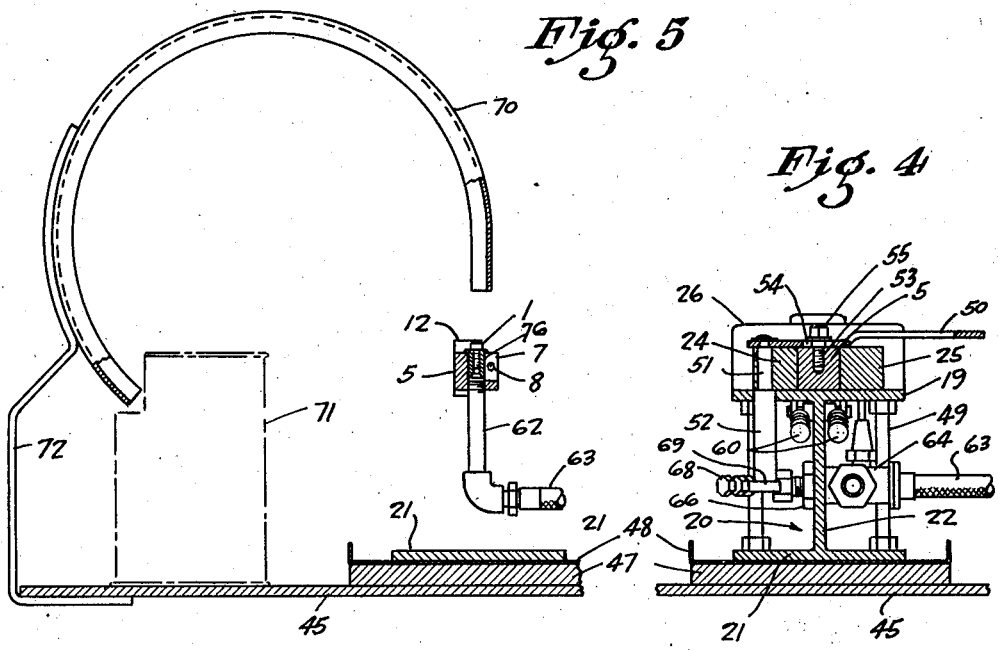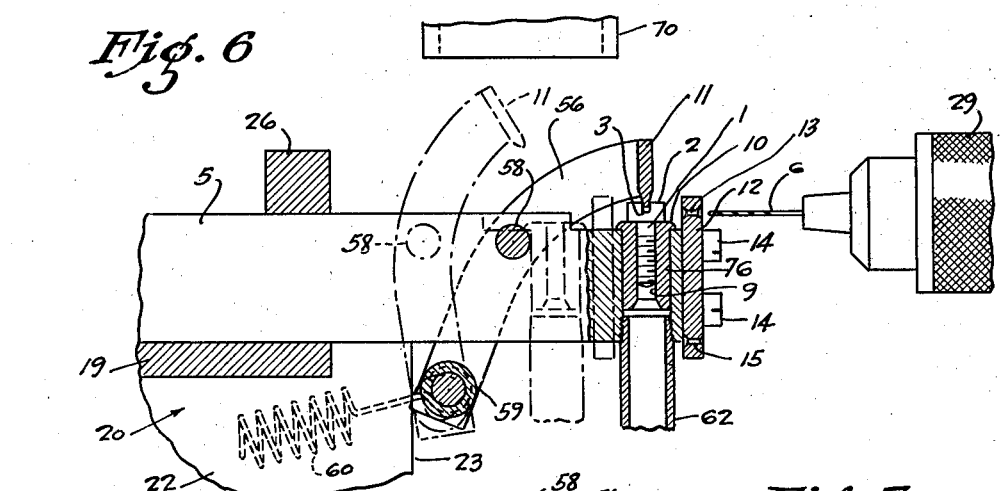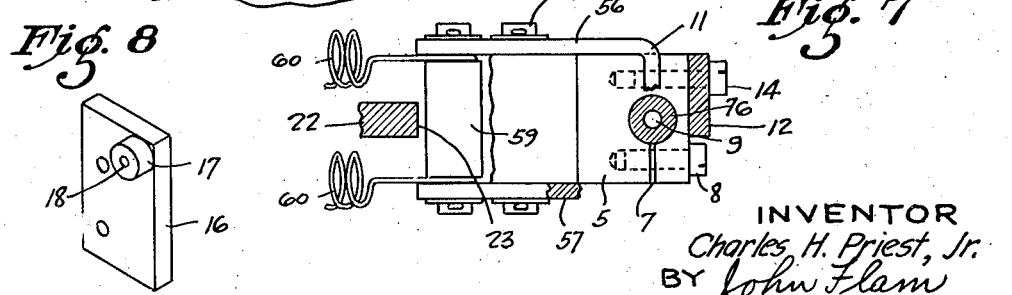

2,397,563

UNITED STATES PATENT OFFICE 2,397,563

DRILLING MACHINE

Charles H. Priest, Jr., Pasadena, Calif.

Application March 24, 1941, Serial No. 384,838

8 Claims. (Cl. 77—5)

This invention relates to a machine for performing a drilling operation, and particularly drilling through the heads of screws or bolts in a direction transverse to the longitudinal axis thereof.

Bolts or screws are used in a great many instances for fastening parts together. Where the structure so formed is subjected to violent vibrations, as in airplanes, for example, care must be taken to ensure against the loosening of the bolts. One of the ways in which such bolts may be locked against turning is to utilize a locking wire passing transversely through the heads of a number of such bolts. These heads must accordingly be drilled for the accommodation of the locking wire. This locking wire must be quite small in diameter, so as to be readily accommodated without material weakening of the bolt.

The process of drilling the fine apertures through the heads accordingly presents a number of annoying problems. The bolt head, which is usually cylindrical, must be held tightly in a clamp and the drill must be guided well enough to prevent slipping of the drill point over the convex cylindrical surface as the drill approaches the head. While careful hand operations may be quite satisfactory to accomplish this work satisfactorily, the expense of such work is necessarily high. It is accordingly one of the objects of this invention to make it possible to perform the drilling operation in a simple and rapid manner.

In order to effect these economies, provisions are made, in accordance with this invention, for facilitating the clamping of the screw or bolt in appropriate position for drilling. This clamping is performed by a mechanism requiring only superficial skill of the operator. Accordingly it is another object of this invention to provide a simple and effective holding means for the work, that may be quickly operated without the necessity of careful or skilled attention.

It is still another object of this invention to make it possible to release and eject the bolt or screw after the drilling operation, in a rapid and simple manner; and preferably by automatic means, responsive to the withdrawal of the drill from the head.

One manner in which this ejection may be effected is by the aid of compressed air, operating to exert a pressure in a direction corresponding to the axis of the bolt or screw. The admission of air to the space where the shank of the bolt is located is accomplished by the aid of a valve controlled so as to open when the drilling operation is completed.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a top plan view of an apparatus incorporating the invention;

Fig. 2 is a side elevation, partly in section, along plane 2—2 of Fig. 1;

Fig. 3 is a sectional view taken along plane 3—3 of Fig. 2;

Figs. 4 and 5 are sectional views taken respectively along planes 4—4 and 5—5 of Fig. 2;

Fig. 6 is an enlarged fragmentary vertical sectional view, of the work support and its associated parts;

Fig. 7 is a fragmentary horizontal sectional view on an enlarged scale, of a part of the apparatus illustrated in Fig. 6;

Fig. 8 is a pictorial illustration of a modified form of guide block for the drill; and Fig. 9 is a pictorial view of a bolt with only part of its shank illustrated, and showing how the bolt head is drilled by the aid of the invention.

The bolt 1 (Figs. 2, 5, 6 and 9) upon which the drilling operation is to be performed is shown in this instance as having a cylindrical head 2. This head is provided with a transverse slot 3 for the accommodation of a screw driver blade. By the aid of the present invention a transverse aperture or drill hole 4 is drilled diametrically across the bolt head 2 for the accommodation of a locking wire. These locking wires are usually of very small diameter such as that produced by a No. 57 drill or the like. Accordingly it is quite essential to provide a guide for the drill that is used for drilling the drill hole 4.

The manner in which the bolt 1 is supported during the drilling operation may be explained most clearly in connection with Figs. 2, 6 and 7. Thus a support 5 is provided which may be moved toward and away from a rotating drill 6 appropriately driven in a manner to be hereinafter explained. This support 5 at its right hand end is provided with a hollow tubular member 76 having a vertical axis. This member 76 is accommodated in a corresponding vertical bore in the support 5. This support 5 is conveniently provided with a slot 7 extending from the bore in the support 5 to one edge of the support. The tubular member 76 may be held firmly in position by the aid of the clamping screw 8 passing across the slot 7. In this way the tubular member 76 may be replaced with any one of a number of tubular members having the same outside diameters but having different size apertures 9 for the accommodation of different size bolts. The aperture 9 is made just large enough to accommodate the shank of the bolt 1.

The tubular member 76 is furthermore provided with a head 10 forming an annular flange at its lower surface resting upon the top surface of the support 5. Upon this head 10 rests the lower surface of the bolt head 2. The shank of bolt 1 may be inserted by hand into the passageway or bore 9. During the drilling operation the head 2 is held firmly clamped against the member 9 as by the aid of a blade-like member 11 which has a tapered blade portion adapted to fit snugly within the slot 3 of the head 2. The manner in which this clamping blade 11 is moved into clamping and releasing positions will be explained hereinafter.

Adjacent the right hand edge of the support 5 there is a guide block 12 fastened as by the screws 14 to the support 5. This guide block is provided with the drill guiding aperture 13 for the accommodation of the drill 6. By this means, as the support 5 is advanced toward the right, the drill 6 first enters the guiding aperture 13 and then engages the head 2 in a direction transverse to the axis of the bolt shank. In order to make it possible to provide guiding apertures of different sizes for different sizes of drills, the block 12 may be reversible in position; and there is indicated in block 12, another guiding aperture 15 which may be brought into position upon appropriate adjustment of the block 12.

Furthermore, for very small screws it is desirable to provide a longer guiding aperture to guide the drill as much as possible against slipping on the convex cylindrical surface of the head 2. For such small screws a guide block 16 illustrated in Fig. 8 may be utilized. In this case mounted on the inner surface of the guide block 16 is a supplemental guide member 17 provided with the guiding aperture 18 alining with the guiding aperture in the block 16. This member 17 extends so closely to the cylindrical head of the screw or bolt as to ensure against slipping of the drill point when the point first engages the bolt head.

Motion of the support 5 in a direction transverse to the axis of the bolt 1 toward and from the drill 6 is accomplished in a manner now to be described. The support 5 has its lower surface resting upon the upper surface of the flange 19 of an H beam 20. The lower flange 21 of this H beam forms a base for the main support of the entire apparatus. The upper horizontal flange 19 is cut away so as to permit the accommodation of other parts of the apparatus to be hereinafter described. The vertical flange 22 (Figs. 2, 3, 4, 6 and 7) is also cut away for the same purpose and provides a vertical surface 23 which is utilized in a manner to be hereinafter explained.

The sides of the support 5 are guided between the guide blocks 24 and 25 fastened in any appropriate manner to the top flange 19. Restraint is placed upon the movement of the support 5 away from the flange 19 as by the aid of a pair of straps 26 fastened as by welding or the like to the flange 19.

Before describing in detail the manner in which the support 5 is advanced and retracted with respect to the drill 6, a short description of the manner in which this drill 6 is driven may be set forth. Thus the lower flange 21 of the H beam 20 is shown in Fig. 2 as extending toward the right. A section 27 of the upper horizontal flange of the beam serves as a support for a drill spindle housing 28, which may be appropriately fastened to the section 27. This drill spindle housing rotatably supports the drill spindle 30 carrying the chuck 29. The spindle 30 extends beyond the right hand end of the spindle housing 28 and may be provided with a grooved pulley 31 (Figs. 1 and 2). This grooved pulley 31 is shown as driven by a flexible circular belt 32 by the aid of a pulley 33 mounted on a countershaft 34. This countershaft 34 is supported in a bearing structure 35 mounted on a standard 36. The countershaft 34 is adapted to be driven by the aid of a pulley 37 driven by belt 38 from the pulley 39. This pulley 39 is shown as mounted on the shaft 40 of an electric motor 41.

In order to provide lubrication for the drill 6, an oil cup 42 (Fig. 2) is shown as appropriately supported on a standard 43. Leading downwardly from the oil cup is a small pipe 44 discharging a regulated small amount of lubricant upon the drill 6.

The standard 43 is shown as supported upon a base member 45 having the angle iron supporting feet 46. Disposed between this base member 45 and the lower flange 21 of the H beam 20 is a spacer 48 adapted to catch the used lubricant. This pan may be appropriately drained in any convenient manner.

In order to stiffen the structure supporting the spindle mechanism 28 of the drill, use may be made of a plurality of struts 49 disposed between the upper and lower flanges 27 and 21 of the H beam 20. Similar struts 49 may be utilized at the left hand end of the apparatus for stiffening the upper flange 19, which serves to support and guide the bolt support 5.

The movement of the support 5 toward and from the drill 6 is accomplished in this instance by the aid of a hand lever 50 (Figs. 1, 2 and 4). This hand lever 50 is joined to the upper end of a shaft or rod 51. This shaft or rod 51 passes through the guide block 24 and is journaled therein. The shaft 51 has a downwardly extending portion 52 (Figs. 3 and 4) having an enlarged diameter. This portion 52 is adapted to perform certain control functions hereinafter explained. The shoulder formed between the enlarged portion 52 and that portion of the shaft 51 which passes through the block 24 contacts the lower surface of this block 24. In this way the shaft 51 is maintained against axial movement by the aid of the lower surface of the lever 50 and the lower surface of the guide 24. The flange 19 is appropriately apertured to permit the passage of the extension 52 downwardly.

The support 5 carries a vertical pin 53 which extends in a slot 54 formed in the lever 50. This pin 53 may be threaded into the top of the support 5 and may be provided with an enlarged cylindrical portion fitting into the slot in lever 50. It may also be provided with a head 55 to restrict the movement of the lever 50 in a vertical direction.

By moving the lever 50 in a counterclockwise direction as viewed in Fig. 1, the support 5 is correspondingly moved toward the drill 6. After the drill 6 passes entirely through the head 2, the lever 50 may be moved in the opposite direction for the removal of the drill 6.

Prior to the drilling operation, the lever 50 is maintained in the retracted position of Fig. 1. The shank of bolt 1 is then dropped by hand into the passageway 9, with the slot 3 of the head transverse to the movement of the support 5. This positioning of the bolt 1 is accomplished by the operator. Slight misalinement of the slot 3 with respect to the clamping blade 11 is of no consequence, as the clamping blade 11 when it engages the slot 3 will automatically cause the bolt head to conform to the clamping position.

The manner in which the clamping blade 11 is operated will now be described. This blade 11 is provided with the arms 56 and 57 that embrace the support 5. A pivot pin 58 extends horizontally through the support 5 and the arms 56 and 57. These arms 56 and 57 furthermore extend below the bottom of the support 5 and are joined by a spacer bar 59 extending below the support 5. In the fully retracted position of the support 5 as illustrated in Fig. 2, this spacer bar 59 is urged into contact with the vertical edge 23 of the vertical web 22 of the H beam 20. This may be accomplished by the aid of a pair of tension springs 60. The right hand ends of these tension springs are anchored around the spacer bar 59. The left hand ends of these springs 60 are shown as anchored in the transverse anchor pin 61 (Figs. 2 and 3). This anchor pin 61 extends through the vertical flange 22.

Now as lever 50 is moved to bring the support 5 toward the drill 6 the pivot 58 of the clamping structure is moved toward the right, away from the dot-and-dash position of Fig. 6, and into the full-line position illustrated therein. Since there is a resilient restraint against movement of the lower spacer bar 59, motion of support 5 toward the right causes the clamping device to be rotated in a clockwise direction and into the clamping position of Fig. 6. After blade 11 fully engages slot 3, further advance of support 5 elongates springs 60, which thus exert an increased clamping force on the blade 11.

Upon retraction of the lever 50 after the drilling operation is performed, the spacer bar 59 is brought into engagement with the vertical surface 23 and further retraction of the support 5 causes the clamping blade 11 to move to the retracted position about the axis of the pin 58. Thus the operation of the clamping device is dependent upon the position of the support 5, as it moves toward and from the drill 6.

Arrangements are made to eject automatically the bolt 1 upon retraction of the lever 50 away from the drill 6. For this purpose use is made of air pressure exerted beneath the bolt 1. Thus there is a pipe or conduit 62 (Figs. 2, 3, 5 and 6) which is threaded into the lower portion of the bore accommodating the guide 76. This pipe or conduit is connected through a flexible hose 63 to the outlet side of an air valve 64. The inlet side of the valve 64 is connected as by conduit 65 to any appropriate source of air pressure. The valve 64 is shown as supported upon the vertical flange 22 (Figs. 3 and 4) as by the aid of the nut 66 that is threaded over a threaded extension of the valve body. This valve 64 is so arranged that it is normally closed by a relatively stiff spring 80, but it may be opened by pressure upon the projecting valve stem 67. This stem 67 is adapted to be urged inwardly by the aid of the adjustable abutment screw 68 (Fig. 3) which is carried by an arm 69. This arm 69 is clamped to the lower portion of the shaft extension 52. Thus as the lever 50 is brought to the retracted position the abutment 68 will contact the stem 67 and will open the valve. The abutment is so adjusted that the valve is opened after the support 5 has been retracted sufficiently to free the clamping blade 11.

Compressed air is thus admitted beneath the bolt 1 into the passageway 9. This compressed air violently ejects the bolt 1 upwardly. When this occurs the bolt 1 is urged into an arcuate guide 70. This arcuate guide is in the form of a chute open at its inner side and having a wall that guides the ejected bolt in a circular manner so as to change the direction of the ejected bolt from the vertical to a downward direction. The sides of the chute are placed at opposite edges of the guiding wall. The guide finally delivers the bolt into a convenient receptacle 71 (Fig. 5). This arcuate guide 70 thus forms a vertical loop. It may be supported as by the aid of a bracket 72 fastened to the base 45. As soon as the ejectment is completed, the lever 50 is released and the spring urging the valve 64 to closed position pushes the stem 67 to the closed position and the supply of compressed air is terminated.

It is also advisable to blow the chips formed during the drilling operation off the bolt 1. For this purpose the outlet side of the valve 64 is provided with a supplemental small conduit 73 (Figs. 1 and 2). The open end of this conduit 73 is directed toward the head of the bolt 1. Accordingly when the valve 64 opens the chips are blown off at the same time that the bolt 1 is ejected.

The manner of operation of the device is apparent from the foregoing. In the free position of Fig. 1, the valve 64 is closed and the support 5 is retracted. The clamping blade 11 is released. The operator then drops a bolt into the passageway 9. Thereafter he urges the lever 50 in a direction to bring the support 5 toward the drill. The first action that occurs is to bring the clamping device from the dot-and-dash position of Fig. 6 to the full line position of Fig. 6. Continued movement of the support 5 stretches the springs 60 and brings the support 5 further toward the drill 6 which then performs the drilling operation. Upon retraction of the hand lever 50 the clamping device 11 is rocked in a counterclockwise direction, freeing the bolt 1. Shortly thereafter the abutment 68 engages the stem 67 and the bolt 1 is ejected by air pressure into the chute or guide 70. Release of the lever 50 will then bring the apparatus to the beginning position of Fig. 1.

What is claimed is:

1. In apparatus for performing a machine operation upon a slotted head bolt, means forming a passage for the shank of the bolt, means for engaging the slot in the head for clamping the head and restraining the bolt against rotation, and a linearly movable support for the passage forming means as well as for the slot engaging means.

2. In apparatus for performing a machine operation upon a slotted head bolt, means forming a passage for the shank of the bolt, means movable toward and away from the head for engaging the slot in the head and thereby for holding the bolt against rotation in the passage, means for moving the passage forming means in a direction transverse to the axis of the bolt, and means operating in response to movement of said passage forming means for operating the slot engaging means.

3. In apparatus for performing a machine operation upon a slotted head bolt, means forming a passage for the shank of the bolt, a movable member having a blade for engaging the slot in the head for holding said bolt against rotation, means for moving the passage forming means in a direction transverse to the axis of the bolt, and means operating in response to movement of said passage forming means for operating said slot engaging blade.

4. In apparatus for drilling an aperture through a bolt and transverse to the axis of the bolt, a support for the bolt, means for releasably clamping the bolt in the support, means for moving the support toward and from a rotary drill and in a direction transverse to the axis of the bolt, means for automatically releasing the clamping means upon movement of the support away from said drill, and means for ejecting said bolt and operated automatically upon further motion of the support.

5. In apparatus for drilling an aperture transversely through a bolt, a support having a passageway to accommodate the shank of the bolt, means for moving the support toward and from a rotary drill and in a direction transverse to the axis of the bolt, and means for ejecting said bolt, comprising means operated upon movement of the support away from the drill for causing fluid pressure to be exerted in said passageway.

6. In apparatus for drilling an aperture transversely through a bolt, said head being slotted, a support having a passageway to accommodate the shank of the bolt, means for moving the support toward and from a rotary drill and in a direction transverse to the axis of the bolt, a blade member adapted to engage the slot of the bolt, and pivotally mounted on said support, and means affected by the position of the movable support for operating said blade member to clamp and release said bolt.

7. In apparatus for performing a machining operation on a bolt, a support arranged for movement toward and away from a rotary drill and having a passageway to accommodate the shank of the bolt, means for moving said support, means including a normally closed valve for conducting compressed air to the passageway to eject the bolt therefrom, means to open said valve, operated upon movement of said support to that extremity of its travel remote from the drill, said means being effective to maintain the valve open as long as the support is substantially at said extremity, and means resiliently urging the support away from said extremity.

8. In apparatus for performing a machining operation on a bolt, a support arranged for movement toward and away from a rotary drill and having a passageway to accommodate the shank of the bolt, a lever operating about a pivot and connected with said support, means including a normally closed valve for conducting compressed air to the passageway to eject the bolt therefrom, means to open said valve, operated by said lever upon actuation of the lever to move said support to that extremity of its travel remote from the drill, said means being effective to maintain the valve open as long as the support is substantially at said extremity, and means resiliently urging the support away from said extremity.

CHARLES H. PRIEST, Jr.